United States Patent
Netz et al.

(10) Patent No.: US 7,716,253 B2
(45) Date of Patent: May 11, 2010

(54) CENTRALIZED KPI FRAMEWORK SYSTEMS AND METHODS

(75) Inventors: Amir Netz, Bellevue, WA (US); Robert B. Zare, Issaquah, WA (US); Mosha Pasumansky, Redmond, WA (US); Irina G. Gorbach, Bellevue, WA (US); Cristian Petculescu, Redmond, WA (US); Thierry D'Hers, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 268 days.

(21) Appl. No.: 11/050,130

(22) Filed: Feb. 3, 2005

(65) Prior Publication Data

US 2006/0010164 A1 Jan. 12, 2006

Related U.S. Application Data

(60) Provisional application No. 60/586,541, filed on Jul. 9, 2004.

(51) Int. Cl.
*G06F 7/00* (2006.01)

(52) U.S. Cl. .................................... 707/803
(58) Field of Classification Search ................ 707/100, 707/104
See application file for complete search history.

(56) References Cited

U.S. PATENT DOCUMENTS

| | | | |
|---|---|---|---|
| 5,937,410 A | 8/1999 | Shen | |
| 6,205,447 B1 | 3/2001 | Malloy | |
| 6,233,583 B1 * | 5/2001 | Hoth | 707/102 |
| 6,377,934 B1 | 4/2002 | Chen et al. | |
| 6,434,557 B1 | 8/2002 | Egilsson | |
| 6,473,750 B1 | 10/2002 | Petculescu et al. | |
| 6,651,055 B1 | 11/2003 | Kilmer et al. | |
| 7,062,479 B2 | 6/2006 | Edmunds et al. | |
| 2002/0116389 A1 | 8/2002 | Chen et al. | |
| 2003/0208468 A1 | 11/2003 | McNab | |
| 2003/0225736 A1 | 12/2003 | Bakalash et al. | |
| 2004/0044671 A1 | 3/2004 | Yoshimura et al. | |
| 2004/0123048 A1 | 6/2004 | Mullins | |
| 2004/0181518 A1 | 9/2004 | Mayo et al. | |
| 2004/0193567 A1 * | 9/2004 | Dettinger et al. | 707/1 |
| 2005/0049831 A1 * | 3/2005 | Lilly | 702/182 |
| 2005/0071737 A1 * | 3/2005 | Adendorff et al. | 715/500 |
| 2005/0216831 A1 * | 9/2005 | Guzik et al. | 715/513 |

(Continued)

OTHER PUBLICATIONS

SQL Server Accelerator for BI Overview. http://www.microsoft.com/sql/prodinfo/previousversions/ssabi/overview.mspx. Jun. 24, 2003, Last accessed Mar. 27, 2006. 4 pages.

(Continued)

*Primary Examiner*—Don Wong
*Assistant Examiner*—Belinda Xue
(74) *Attorney, Agent, or Firm*—Workman Nydegger

(57) ABSTRACT

The subject invention pertains to a centralized key performance indicator (KPI) framework and systems and methods of utilization. In particular, KPIs can be defined and centrally stored as data or metadata in a data store. Systems and methods are provided to enable, among other things, KPI definition, storage, identification of defined or available KPIs, and interaction with the KPIs. For instance, an interface is provided to allow KPI data to be requested and retrieved from a source such as a database. A generic application program or users thereof can then interact with and display KPI data without knowing anything a priori about the stored data or the structure thereof.

6 Claims, 17 Drawing Sheets

U.S. PATENT DOCUMENTS

2005/0228818 A1 10/2005 Murthy
2005/0256896 A1* 11/2005 Pfeifer et al. ............... 707/102
2006/0020619 A1 1/2006 Netz
2006/0020933 A1 1/2006 Pasumansky

OTHER PUBLICATIONS

Microsoft BI Accelerator Overview, Chapter 1, published: Jul. 10, 2002, 17 pages plus coversheet www.microsoft.com/sul/prodinfo/perviousversions/ssabi/ch1overview.mspx .

Adam Shapiro, "Analysis Services: Choosing Dimension Types in SQL Server 2000 Analysis Services", Microsoft SQL 2000 Technical Articles, Analysis Services: Choosing Dimension Types in SQL Server 2000 Analysis Services, Published: Jul. 2000, 18 pages.

Microsoft Corp. "Exprssions (MDX)" Microsoft TechNet, SQL Server 2005 Books Online (Sep. 2007), 3 pages.

Office Action dated Sep. 4, 2007 cited in U.S. Appl. No. 11/116,924.
Office Action dated Mar. 5, 2008 cited in U.S. Appl. No. 11/116,924.
Office Action dated Jan. 5, 2009 cited in U.S. Appl. No. 11/116,924.
Office Action dated May 9, 2007 cited in U.S. Appl. No. 11/074,508.
Office Action dated Oct. 17, 2007 cited in U.S. Appl. No. 11/074,508.
Office Action dated Jan. 29, 2008 cited in U.S. Appl. No. 11/074,508.
Office Action dated Jul. 11, 2008 cited in U.S. Appl. No. 11/074,508.
Office Action dated Mar. 2, 2009 cited in U.S. Appl. No. 11/074,508.
Office Action dated Nov. 9, 2009 cited in U.S. Appl. No. 11/074,508.
Youness, "Using NDX and ADOMD to Access Microsoft OLAP Data" dated 2000.
Office Action dated Dec. 8, 2009 cited in U.S. Appl. No. 11/116,924.

* cited by examiner

CENTRALIZED KPI FRAMEWORK SYSTEMS AND METHODS

CROSS-REFERENCE TO RELATED APPLICATIONS

This application claims the benefit of U.S. Provisional Application Ser. No. 60/586,541, filed Jul. 9, 2004, entitled "Systems and Methods to Analyze Database Data," the entirety of which is incorporated herein by reference.

TECHNICAL FIELD

The subject invention relates generally to computers and more particularly toward databases and key performance indicators (KPIs).

BACKGROUND

Computers and other related technology pervade modern business enterprises as well as other organizations. Businesses utilize computers to improve the productivity of their employees and manage operations. Today businesses rely on a plurality of performance data derived from enterprise resource planning (ERP) software, customer relationship management (CRM) software as well as spreadsheets and other data files. Unfortunately, each system defines and presents data in a different manner. Moreover, each system provides information on different aspects of a business operation. Hence, business professionals must expend a large amount of time and energy to consolidate and digest great quantities of data to determine what is important to its business and its future goals. Key performance indicators can facilitate providing a business decision maker with a consolidated understanding of company performance. This allows executives and decision makers to keep track of the pulse of business and act quickly to take advantage of opportunities to propel business forward toward established goals and objectives Key performance indicators (KPIs) are customizable business metrics utilized to present the status and trends in an organization in an easily cognizable manner. Once a business or other organization defines its mission or objectives, KPIs can be employed to measure progress toward those objectives. In general, each KPI can have a target value and an actual value. The target value represents a quantitative goal or object that is considered key or critical to the success of a business or organization. Thus, target values can be quite different for distinct businesses as their goals and focus is often dissimilar. For example, business can have KPIs concerning sales, net profit, and debt ratio, while a school may define a KPI related to graduation rate. Of course, the target value can change over time but is for the most part a stable value. The actual value is the value that fluctuates often based on the actions and performance of a business. Actual values can be compared to target values to determine a business' health or progress toward the target value. Thus, KPIs are advantageous in that they provide a clear description of organizational goals and distill vast quantities of data down to a single value that can be utilized to continuously monitor business performance and its progress toward organization benchmarks.

KPIs and scorecards (i.e., groups of KPIs) are not a novel business concept. Business decision makers have been utilizing KPI applications for some time now to measure the health of their business. KPI applications conventionally contain logic expressions for calculating the value of the KPI. These applications can then retrieve specific data specified by the expression and execute the logic to determine the KPI value. Subsequently, such calculated data can be displayed in a convenient manner such as presenting the KPI value, the threshold and some graphical indication of performance based on the value and the threshold. For example, if the value is above the threshold then a graphical representation of thumbs up can be displayed. Alternatively, if the value is below the threshold then a graphical representation of thumbs downs can be displayed.

Development of a KPI application includes several steps. First, a user or organization is queried to determine which KPIs they would like to be implemented in accordance with their mission and goals. Next, the functions or expressions that produce the KPIs are determined based on knowledge of the relevant database schema and specified in a specific API application. This enables the application to interact directly with a database based on its knowledge of the database schema to retrieve data necessary to calculate KPI values.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

Briefly described, the subject invention pertains to a centralized KPI system or framework as well as various systems and methods of use and interaction therewith. Unlike conventional stand-alone KPI applications, the subject invention provides an automated way for generic applications that do not know anything about a particular business application to be able to interact with and display KPI data on any business data structure (e.g., cubes, tables . . . ) without a priori knowledge of the actual data schema or logic. Furthermore, generic applications do not have to designate any processing time to calculate KPI values. The values can be determined and stored centrally, for example by a server. This allows generic applications and tools to display KPIs, even those created after the generic application.

According to one aspect of the invention, a system is provided for specifying and storing KPI components to a data source. KPI components can include definitions for one or more KPIs. Pluralities of systems are disclosed to facilitate definition of KPI components via specification of KPI metadata such as properties, attribute, or elements some of which are specified as values and others as expressions. Once a KPI component is defined, it can then be stored centrally to a data source such as a database (e.g., multidimensional database cube, table . . . ). According to a specific aspect of the invention, such centralized storage can provide for tight coupling between KPIs and warehouse data. Furthermore, centralized storage of KPI ensures consistency of KPI data amongst a myriad of users.

According to an aspect of the invention, an expression engine can be associated with the central data source. The expression engine can execute functions or expressions specified in a KPI component to generate values. This can be accomplished by retrieving specified data from the data source and calculating the value specified by the expression. According to a specific aspect of the invention, the expression engine can be proactive and automatically evaluate expressions and cache results to facilitate real time interaction with KPIs. Furthermore, the expression engine can automatically create expressions or calculations and perform KPI metadata adjustments in order to support specified KPIs.

According to another aspect of the invention, several interfaces are provided to enable interaction with centrally stored KPI components. For instance, an application interface is provided to allow a generic application component to discover available KPIs for use. More specifically, an application can send a request for available KPIs via an interface. This request can then be processed and data regarding the stored and available KPIs (e.g., a list of KPIs) transmitted back to the application via the interface. The transmitted metadata can include, among other things, the KPI name. Thereafter, the application can interact with and display KPI data including but not limited to value, goal, status, trend, and weight by transmitting queries to the data source for execution such as but not limited to KPIValue(<KPI Name>), KPIGoal(<KPI Name>), KPIStatus, (<KPI Name>), KPITrend(<KPI Name>), and KPIWeight(<KPI Name>).

According to yet another aspect of the invention a system and method are provided for KPI component extensibility. KPIs and KPI components are defined by a set of properties or attributes. For purposes of efficiency and optimized performance, a system can be designed with a fixed number default properties or attributes. However, later if particular attributes are desired that are not presently provided, an extension component can be defined specifying those desired or custom attributes and linked to one or more KPI components.

According to another aspect of the invention, the central data store can be part of a database management system or server remote or proximate to applications that interact therewith. Hence, data defining KPI component can take advantage of the efficient storage, management, and security associated with such systems.

To the accomplishment of the foregoing and related ends, certain illustrative aspects of the invention are described herein in connection with the following description and the annexed drawings. These aspects are indicative of various ways in which the invention may be practiced, all of which are intended to be covered by the present invention. Other advantages and novel features of the invention may become apparent from the following detailed description of the invention when considered in conjunction with the drawings.

DETAILED DESCRIPTION

Figure 1:
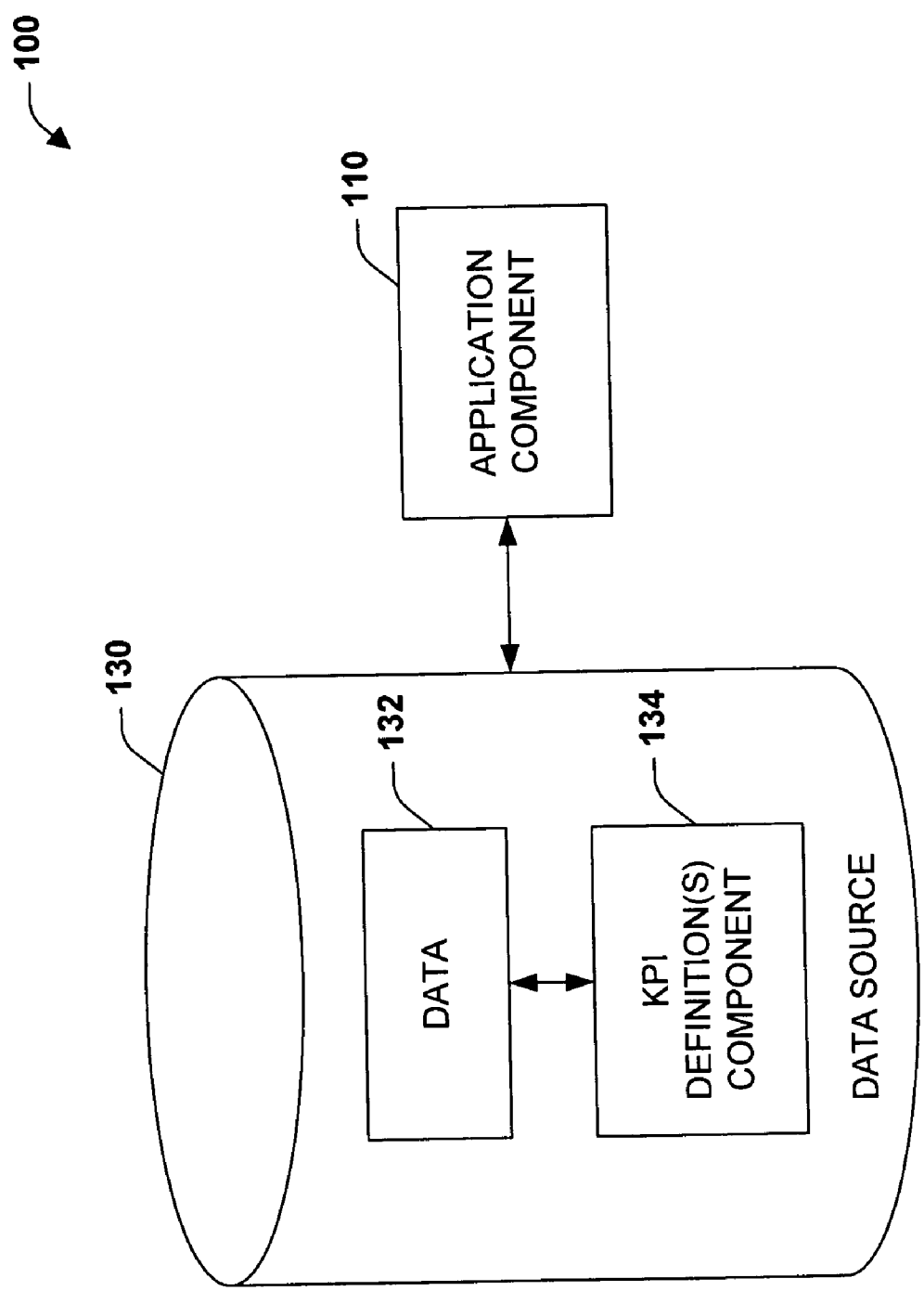
FIG. 1 is a block diagram of key performance indicator system in accordance with an aspect of the subject invention.

The present invention is now described with reference to the annexed drawings, wherein like numerals refer to like or corresponding elements throughout. It should be understood, however, that the drawings and detailed description thereto are not intended to limit the invention to the particular form disclosed. Rather, the intention is to cover all modifications, equivalents, and alternatives falling within the spirit and scope of the present invention.

As used in this application, the terms "component" and "system" and the like are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the present invention may be implemented as a method, apparatus, or article of manufacture using standard programming and/or engineering techniques to produce software, firmware, hardware, or any combination thereof to control a computer to implement the disclosed invention. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the subject invention.

Artificial intelligence based systems (e.g., explicitly and/or implicitly trained classifiers) can be employed in connection with performing inference and/or probabilistic determinations and/or statistical-based determinations as in accordance with one or more aspects of the subject invention as described hereinafter. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject invention Turning initially to FIG. 1, a key performance indicator system 100 is illustrated in accordance with an aspect of the subject invention. The system 100 provides a framework for development, implementation, and execution of KPIs. System 100 can include an application component 110 and a data source 130 including data 132 and KPI component 134. Application component 110 can be a generic computer program or computer program product, as defined herein, including a plurality or executable instructions for performing one or more functions. One of those functions can include presentation of key performance indicators. Data source 130 is a computer accessible component that provides and/or stores data 132. Accordingly, data source 130 can be a computer database residing on a computer readable medium or part of a database management system or server. Data 132 in data source 130 is stored in an organized fashion to facilitated search and retrieved of particular data. There are an infinite number of ways to organized data in source 130. According to one aspect of the invention, data source 130 is organized as a multidimensional database wherein data storage structures include cubes comprising dimensions, hierarchies and measures to name a few. However, it should be appreciated that other types of databases and storage structures are contemplated by and considered within the scope of the present invention. KPI component 134 includes KPI definitions or metadata specifying a particular key performance indicator.

Key performance indicators can be defined as a collection of properties, attributes and/or elements including but not limited to name, id, description, display folder, annotation, value, goal, trend, weight, status graphic, trend graphic, current time member, and associated measure group id. The name attribute can simply provide a name or label for the KPI, for example quarterly revenue or customer satisfaction. To help further distinguish one KPI from another, the id attribute can be used as an identifier of the KPI. Description can state or describe the KPI to facilitate understanding thereof. The translation attribute can provide a set of language translations for the KPI to facilitate use in multilingual systems and environments. The display folder attribute identifies or associates a KPI with a display folder. This can be employed by an application to determine presentation of KPIs to a user. For example, the KPI named "Sales" can be associated with a folder named "Profitability." The display folder attribute can also facilitated hierarchical representation of KPIs. For instance, the folder named "Profitability" including the "Sales" KPI can also be associated or a child or with a folder named "Financial Scorecard." The annotation attribute can be utilized to identify and facilitate linking to a KPI schema extension component, as described in further detail infra. The value attribute can provide an expression that returns the actual value of the KPI. For example, the function can specify relationships between stored data to generate a value such as the total amount of sales or revenue (e.g., $8,000,000.00) or a rate (e.g., 8%, 0.08 . . . ). The goal element can be an expression that returns the goal of the KPI, for instance, 100% customer satisfaction rating or a number representative thereof. The trend attribute can be an expression that returns the trend of the KPI over time. Often times the trend is normalized to an expression returning values between −1 and 1 indicating a downward trend, an upward trend or something in between. The weight attribute can be an expression that returns the weight of the KPI. For example, where the KPI has a parent KPI, this attribute might define the weight of the contribution of the subject KPI to its parent. The status and trend graphic attributes can be employed to identify a particular graphical representation for the status and trend respectively to facilitate fast and easy understanding of the KPI. For instance, a stop light or a gauge can be utilized to represent the status, whereas an arrow can represent the trend. The current time member element can be an expression that defined the current time member that is relevant for the KPI. This allows different KPIs to have different time members, possibly different from the default member of the time dimension in a multidimensional context. Finally, the associated measure group id attribute can represent the associated measure group for the KPI. This can be utilized to specify the dimensionality of the KPI. It should be appreciated that the aforementioned KPI attributes or elements have be presented merely as an example set. Additional attributes may be included and/or some of the above elements can be excluded. Furthermore, some of the attributes may be optional while others may be mandatory.

In accordance with an aspect of the invention, the KPI component definitions can be part of the metadata that describes data 132. As mentioned, data 132 can be organized in a manner conducive to search and retrieval of data. However, it would be almost impossible to find and retrieve data if an entity were not aware of the manner in which the data is stored. Metadata provides such information and can be located within the data store 130 thereby constituting part of the data. In a multidimensional database environment, the metadata can include information pertaining the cubes in the data store, the dimensions available in a particular cube, hierarchies available in particular dimensions, levels available in dimensions, as well as information about the measures available in the data source, properties, members, and functions. Similarly, in a relational database environment, metadata can pertain to tables, rows, columns, and relations amongst structures. KPI definitions can be provided as part of the data store metadata and accessed in a similar manner. Furthermore, it should be appreciated that KPI component definitions can be woven within the metadata such that KPIs are associated with relevant data and metadata. This technique is unique in that as an entity navigates around data in a cube, for instance, the definition of the KPI, the status, trend, and graphics will change, as they are associated with particular data.

Central storage of KPI components with other data has additional advantages besides tight coupling between KPI components and data or metadata. According to an aspect of the invention, data source or store 130 can be part of a database management system or server. Hence, KPI components can take advantage of the efficiencies in storage, management, and security among other things inherent with such systems. Furthermore, such a system provides for a single consistent view of KPIs and associated metrics. This remedies known problems with conventional KPIs applications. In particular, different decision makers at different levels have been known to identify different key performance indicators. Thus, there has been inconsistency in the definition of organizational goals and objectives and hence key performance indicators. Additionally, even when decision makers agree upon a particular KPI, each decision maker could and often would calculate the KPI differently. Centralized KPI storage ensures that everyone will be viewing the same data.

The system 100 thereby provides a generic or standard framework for defining and interacting with KPIs. In this system, the application does not need to be aware of desired KPIs rather it can simply utilize and interact with KPIs specified in the data source even those specified later than the application. Thus, rather than determining the desired KPIs and binding the implementation thereof to a specific KPI application, the system 100 enables any client application 110 to utilize and display KPIs as they are defined as part of the data not a specific application. In particular, a client application 110 can interrogate the data source 130 to determine what KPI components are provided thereby and how they are defined. For example, an entity could determine what the status graphic is for a particular KPI and when it should show green, yellow, and red.

Figure 2:
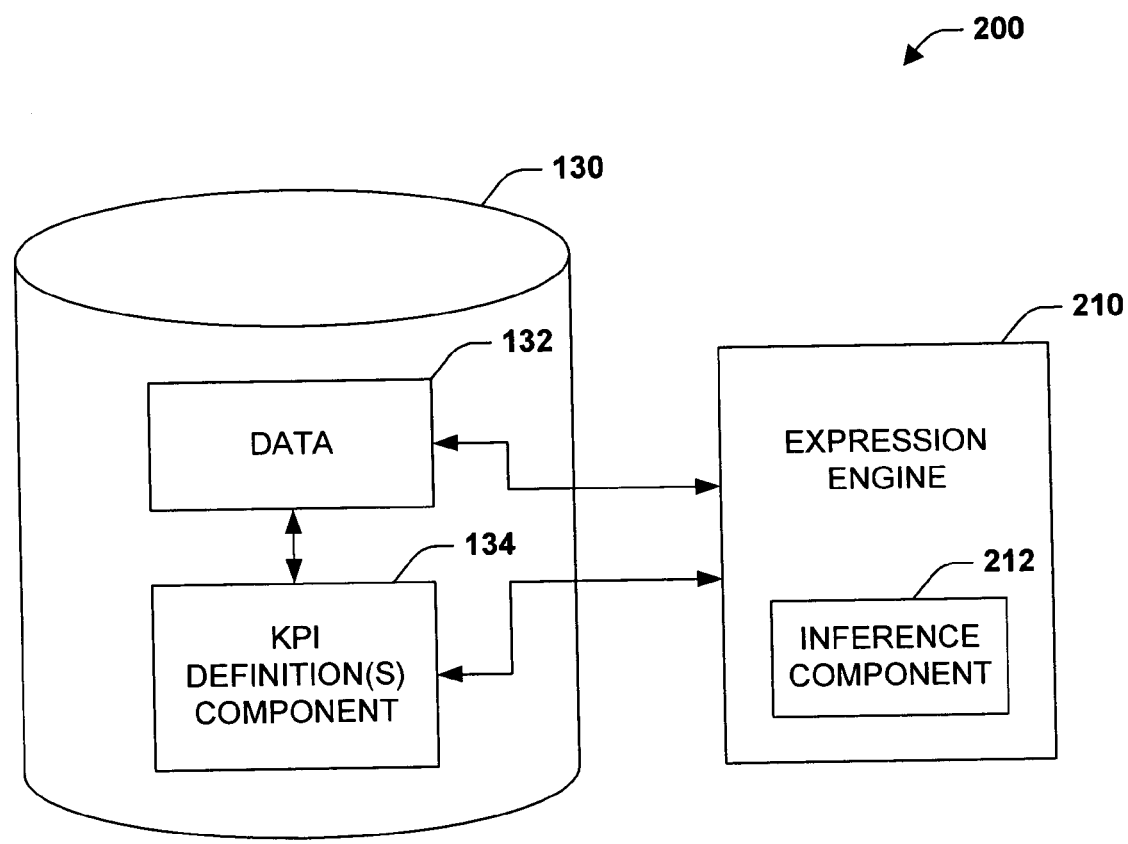
FIG. 2 is a block diagram of a system that automatically generates or evaluates KPI attributes in accordance with an aspect of the subject invention.

FIG. 2 depicts a system 200 to automatically generate and/or evaluate KPI attributes. System 200 includes data source 130 including data 132 and KPI component(s) 134, and expression engine component 210 including inference component 212. As described above, KPI component 134 can include a number of attributes describing and defining a KPI. Some of these attributes are provided as expressions or functions to be evaluated. In multidimensional database terms, these expressions are often referred to as calculated members. Expression engine component (or simply expression engine) 210 is a mechanism for expression evaluation, among other things. In particular, expression engine 210 can retrieve the expression and retrieve data from data source data 132 specified in the expression. Expression engine 210 can thereafter evaluate the expression for presentation, storage, or transfer to an application. Such calculations can be initiated automatically upon a request for or viewing of a particular KPI or data associated therewith. Furthermore, it should be appreciated that calculations can be optimized by the expression engine to facilitate expeditious evaluation. For example, upon retrieving an expression with multiple steps the expression engine can order or reorder those steps such that the calculation will be processed most efficiently. The expression engine 210 can also modify KPI definition metadata to support more efficient KPI evaluation in the future. According to one aspect of the invention, system 200 can be part of a server. Hence, expression engine can optimize the expression for processing by the specific server. The enormous processing power of the server can then be employed to produce expression results in or substantially close to real-time.

Furthermore, it should be appreciated that expression engine 210 can engage in proactive or anticipatory caching to further aid in producing results in real-time. In accordance with an aspect of the invention, inference component 212 can be employed in conjunction with expression engine 210 to, among other things, facilitate determining when expressions should be evaluated and cached in memory. Inference component infers or generates inferences, as that term is defined herein, concerning whether particular KPI component expressions will be needed or requested. Based on the retrieval or requests for other data inference component 212 can generate an inference value representing the probability that a KPI component expression or group of expressions will be requested and thus need to be evaluated. Once the inference value is greater than or equal to a threshold value, the expression engine can proactively begin evaluating and caching expression results. For example, if data is being requested concerning a particular data cube or other structure, then the likelihood that KPI components associated with that cube or structure will be high. Accordingly, the expression engine can initiate evaluation and caching of KPI component expressions.

It should also be appreciated, that inference component 212 and/or other intelligent components can be employed by the expression engine 210 to automatically and intelligently generate expressions or calculations and/or perform metadata adjustments in order to support specified KPIs. For example, KPI definitions can be specified in somewhat of an abstract manner and the expression engine can generate specific or optimized calculations for particular data or data sets. Likewise, expression engine 210 can produce new or adjust old KPI component definitions to support specified KPIs.

Figure 3:
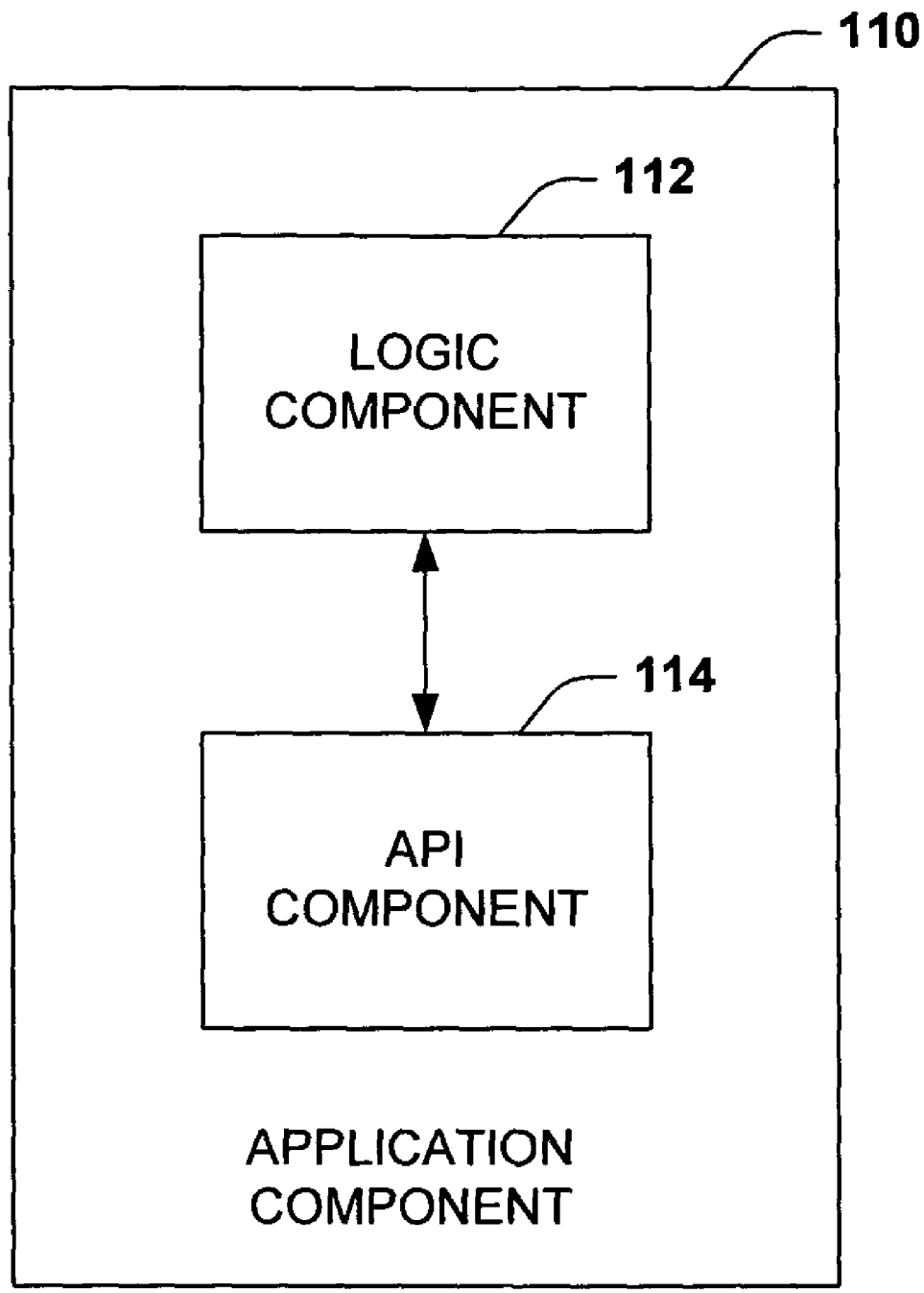
FIG. 3 is a block diagram of an application component in accordance with an aspect of the subject invention.

FIG. 3 is a block diagram of an application component 110 in accordance with an aspect of the subject invention. Application component 110 is a component that facilitates execution of one or more useful functions on a computer. Accordingly, application component can correspond to a computer program product as that term is defined herein. Application component 110 can include a logic component 112 and an application programming interface (API) component 114. Logic component 112 provides for the main functionality of the application 110. For example, if the program is a database browser program, the functionality of logic may consist of specifying the data to be displayed and the manner in which it will be presented (e.g., where, how, frames, text box . . . ). API component 114 can provide a set of procedures, routines or protocol to facilitate interaction with another application component 110 or a data source. Hence, API component 114 can enable interaction with data source 130 of FIG. 1 or a data provider associated with the source 130 and facilitate interaction with KPI components. For example, API component can aid in retrieval of KPIs and/or discovery of available KPIs and properties, attributes, or elements thereof. The retrieved KPIs can then be utilized by application 112, which could display the KPIs to a user possibly along with other elements and appealing graphics. Furthermore, although illustrated and described as part of the application component 110 it should be appreciated that API component 114 can reside outside the application component 110 and be called thereby to enable utilization of API component 114 functions and functionality.

Figure 4:
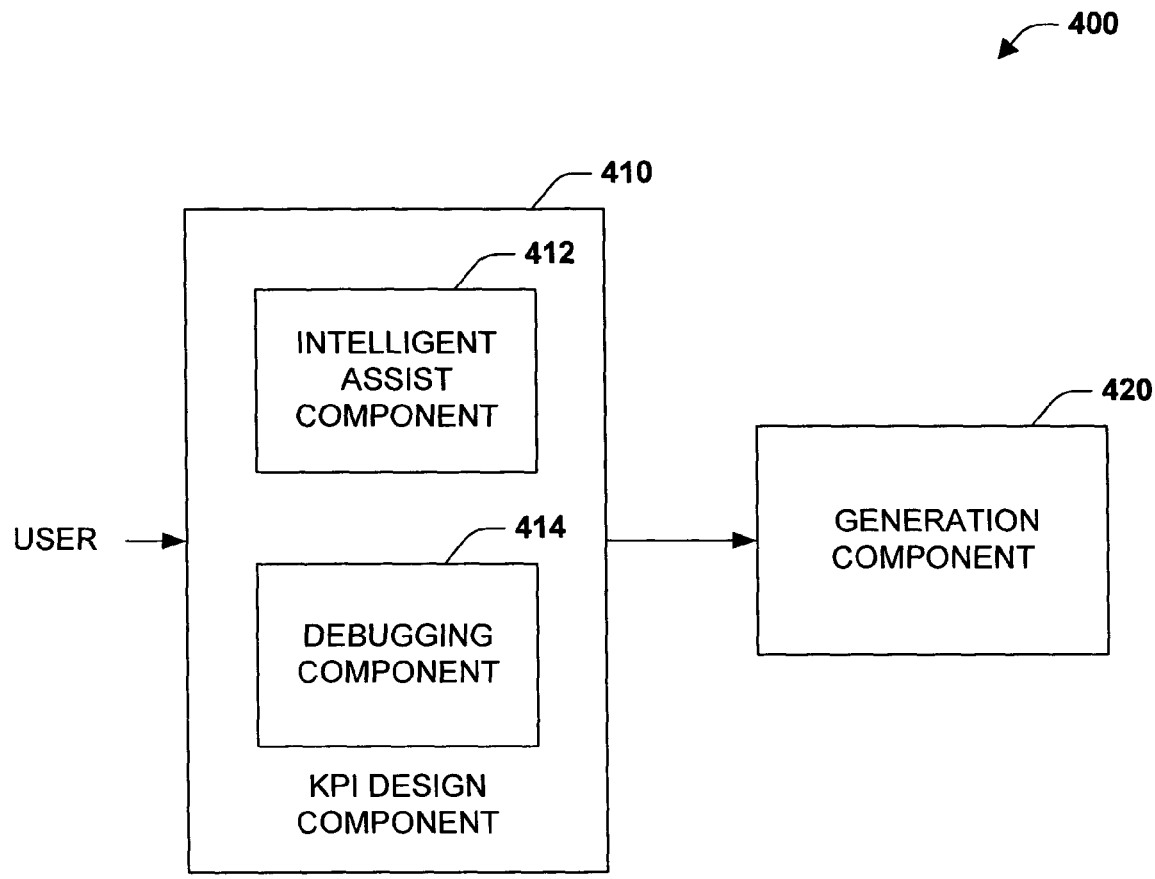
FIG. 4 is a block diagram of a KPI specification system in accordance with an aspect of the subject invention.

FIG. 4 illustrates a KPI specification system 400 in accordance with an aspect of the subject invention. System 400 can include a design component 410 and a definition generation component 420. Design component 410 receives input and provides feedback to a user concerning specification or definition of one or more KPI components. According to one specific application of the subject invention, design component 410 can aid a user in generating data definition language (DDL) statements to specify KPI component attributes or metadata. The data definition language can be the same language employed to specify a database schema. Thus, it should be noted that the language can be extended to enable specification or definition of KPIs similar to the manner in which a database schema is specified. For example, the DDL can be extended to enable specification of KPI component attributes including but not limited to name, id, description, translation, display folder, associated measure group id, value, goal, status, trend, trend graphic, status graphic, current time member, and annotation. As can be appreciated, some of these attributes can be specified as strings of characters or numbers some of which may contain expressions that can be evaluated, for example by expression engine 210 (FIG. 2).

Design component 410 can include an intelligent assist component 412 and a debug component 414, among other components. Intelligent assist component 412 enables programmatic assistance to be provided to a user. In particular, intelligent assist component 412 can interact with a code editor or graphic user interface (GUI) to facilitate specification of one or more KPIs, wherein the code editor or GUI provide a code specification and editing mechanism. For example, a programmer can manually specify code and/or cut and paste code blocks utilizing a graphical interface within the editor. Intelligent assist component 412 can provide real-time assistance to the code editor based on the source code language(s) operated thereon by the editor. The intelligent assistance can be predictions, suggestions, or inferences based on code context. For example, statements, functions, classes, etc., can be automatically completed based on specification of a portion thereof. Debug component 414 can analyze the specified code and generate error messages and/or suggestive corrective actions in response to syntactic and/or semantic errors in the specified code.

Figure 5:
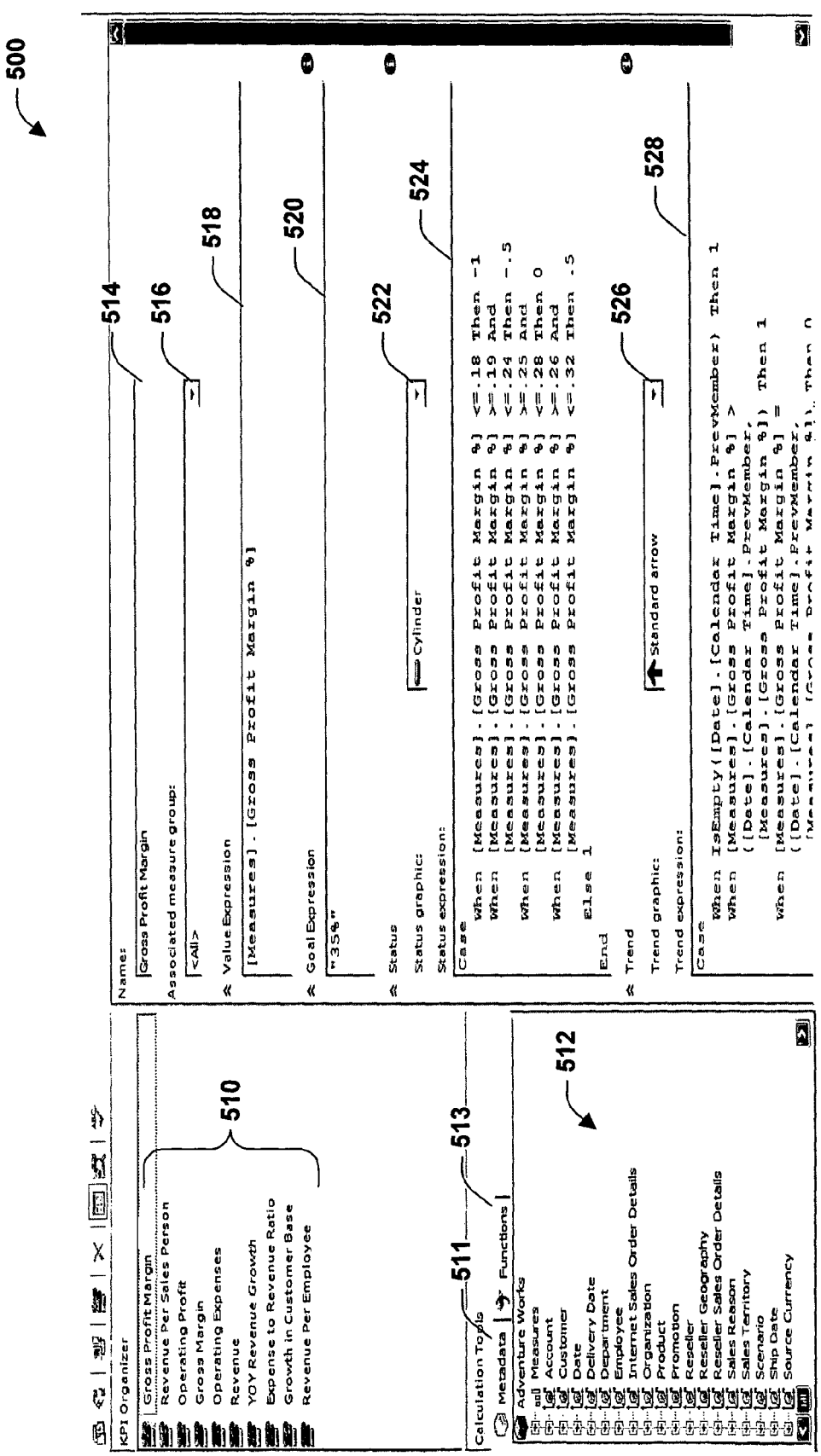
FIG. 5 illustrates a graphical user interface in accordance with an aspect of the subject invention.

Turning briefly to FIG. 5, an exemplary graphical user interface 500 is illustrated. Graphical user interface 500 can be employed to facilitate specification of KPIs. At 510, a text box can display a list of KPIs. Upon specification of a KPI, its name can be displayed at 510. Selection of one of the KPI names in the text box can then result in display of particular attributes in other locations 514-528 to enable editing. Selection of tab 511 results in display of selectable metadata in text box 512. Alternatively, selection of tab 513 can result in the display of selectable functions in text box 512. Text box 514 provides a space for specifying the name of a KPI. This box 514 can be populated by typing a name therein or alternatively selecting a KPI from list 510. A drop down menu 516 is provided to enable selection of an associated measure group. Text box 518 is provided for specification or display of the function defining the KPI value, here "[Measures].[Gross Profit Margin %]." Text box 518 can be populated by simply tying in the function and/or in selection of metadata and/or functions from text box 512. Drop down menu 520 provides a mechanism for selecting and displaying a status graphic. Here, a cylinder has been selected. Similarly, drop down menu 526 provides a mechanism for selection and display of a trend graphic. As shown, a standard arrow is displayed. Text boxes 524 and 528 are provided to enable specification of expressions defining KPI attributes status and trend. This code can be specified manually by typing in the expressions and/or by employing, via selection, metadata and functions provided displayed in text box 512.

Returning to FIG. 4, upon specification of KPI definitions employing design component 410 such data can be passed or retrieved by generation component 420. Generation component can then produce or materialize a KPI component in a standard format. For example, generation component 410 can receive one or more DDL statements specifying one or more KPI components. The generation component can employ or compile such statements to generate an XML (eXtensible Markup Language) file or structure that can be stored to the data store 130 (FIG. 1). Upon storage, the KPI components can be utilized as described throughout. Furthermore, it should be noted that according to an aspect of the invention, a database administrator could utilize system 400 to perform the function of defining and storing KPI to a central storage location.

Figure 6:
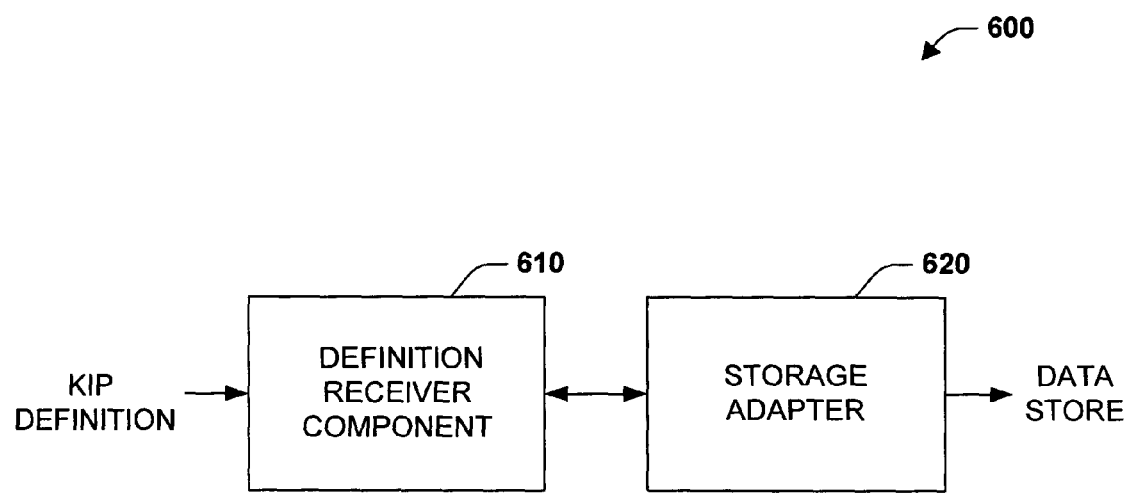
FIG. 6 is a block diagram of a KPI specification interface in accordance with an aspect of the subject invention.

FIG. 6 depicts a KPI specification interface 600 in accordance with an aspect of the subject invention. Interface 600 provides a mechanism for saving KPI definitions or KPI components to a data source such as a database. The interface 600 acts as a conduit or connection between a component(s) that enables specification of KPI definitions (e.g., code editor, GUI, compiler, code generator . . . ) and a data store. Interface 600 can include a definition receiver component 610 and a storage adapter component 620. Definition receiver component 610 receives or retrieves KPI definitions. For example, the receiver component 610 can receive an XML document defining KPI components. The storage adapter component 620 receives the KPI definitions from the receiver component 620. Upon receipt of the definitions, the storage adapter 620 can then communicate with a data store or source and save the definitions to the store. This can be a simple process of simply saving file (e.g., XML) or structures contained therein to a location on the data store. Alternatively, this can involve a more complicated procedure of storing particular KPIs or the structures defining them in specific locations in accordance with their association with other metadata and/or linking them to metadata.

Figure 7:
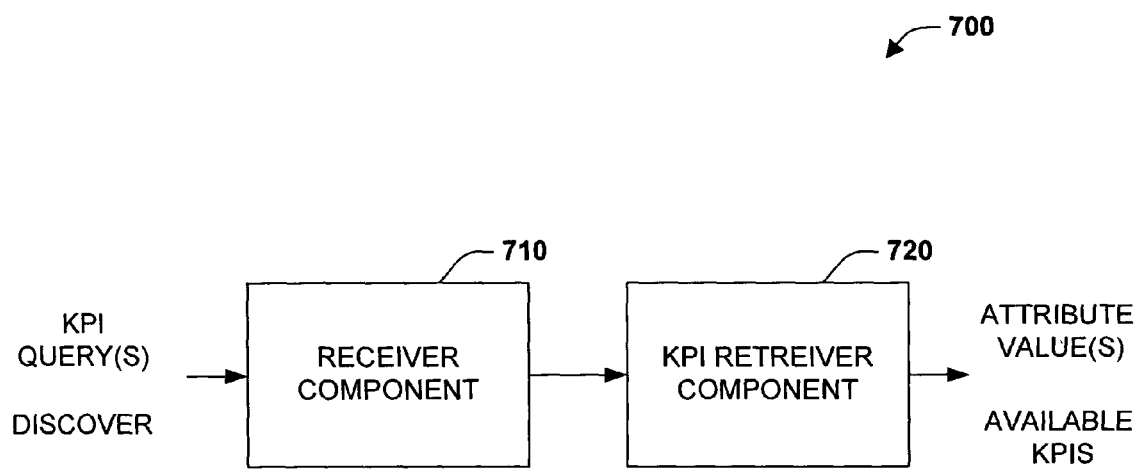
FIG. 7 is a block diagram of a KPI interaction system in accordance with an aspect of the subject invention.

Turning to FIG. 7, a KPI interaction system 700 is depicted in accordance with an aspect of the invention. KPI interaction system 700 provides a means and mechanism for interacting with KPI components. Interaction system 700 can include a receiver component 710 and a retriever component 720. Receiver component 710 receives a requested from an entity for data concerning a KPI. This requested is passed on to retriever component 720. Thereafter, retriever component 720 retrieves the requested KPI data from a data store and returns it. According to one aspect of the invention interaction system 700 can correspond to a query system and language including but not limited to MDX (Multi-Dimensional eXpressions). MDX is a system for retrieving, manipulating or otherwise interacting with multidimensional data or objects. For example, MDX provides commands or functions for creating and deleting cubes, dimensions, measures, and other objects. Such a system can be extended by adding new MDX functions to retrieve members or data corresponding to a given KPI. In accordance with an aspect of the invention, functions can be added including but not limited to KPI value, KPI goal, KPI status, KPI trend, KPI weight, and KPI current time member. Each of these new functions can receive a KPI name or identifier and return a value specific to its particular function. For instance, the value function can return a KPI value, the trend function can return the value for the trend (e.g. between −1 and 1), and so forth. With respect to the system 700, the receiver component 710 receives a KPI query (e.g. KPIValue(<KPI Name>), KPIValue(<KPI Name>), KPITrend(<KPI Name>) . . . ) and passes it to retriever component 720 which executes or schedules execution (e.g., on another component such as execution engine) of the function or query on the data source. Upon receipt of the value, retriever component can pass or communicated the value to the receiver component, which can subsequently pass or communicate the result to a requesting entity such as a generic application.

KPI interaction system 700 can also be employed to retrieve information about or discover KPIs as well as executing queries on KPIs and returning results. Conventionally, stand-alone KPI applications contain the definitions and executable code for generating KPIs. However, in accordance with an aspect of the subject inventions, client applications that wish to use or support KPIs need a mechanism to determine what KPIs are available for their use. System 700 provides such a mechanism. In particular, receiver component 710 can receive a request for information regarding KPIs, such as a list thereof. For example, the request can be in the form of query or command such as DiscoverKPIs( ). The retriever component, upon receipt of this request, can query a data source and retrieve information regarding all available KPIs (i.e., defined KPIs). This information can include such things as the name of the KPI, the id, a description of the KPI, display folder, and/or other KPI attribute or element data. According to one aspect of the invention the KPI component definitions can be store in a marked up format such as XML, hence results can be returned in the same format. For example:

```
<DiscoverResponse>
    <return>
        <root>
            <row>
                <KPI_NAME>Gross Profit Margin</KPI_NAME>
                <KPI_ID> . . . </KPI_ID>
                . . .
            </row>
            <row>
                <KPI_NAME>Operating Profit</KPI_NAME>
                <KPI_ID> . . . </KPI_ID>
                . . .
            </row>
        </root>
    </return>
</DiscoverResponse>
```

It should be noted and appreciated that the discover request or query can be limited by restrictive constraints to return only specifically desired information in a particular format, for example a list of KPI names and descriptions. Furthermore, it should be appreciated that the subject invention can be implemented using a variety of systems and interfaces. Accordingly, commands, queries, functions, and return types may vary based on specific implementation details. For example, in a specific implementation where the OLE DB is employed to retrieve data from a data source the return type can be a schema rowset.

Figure 8:
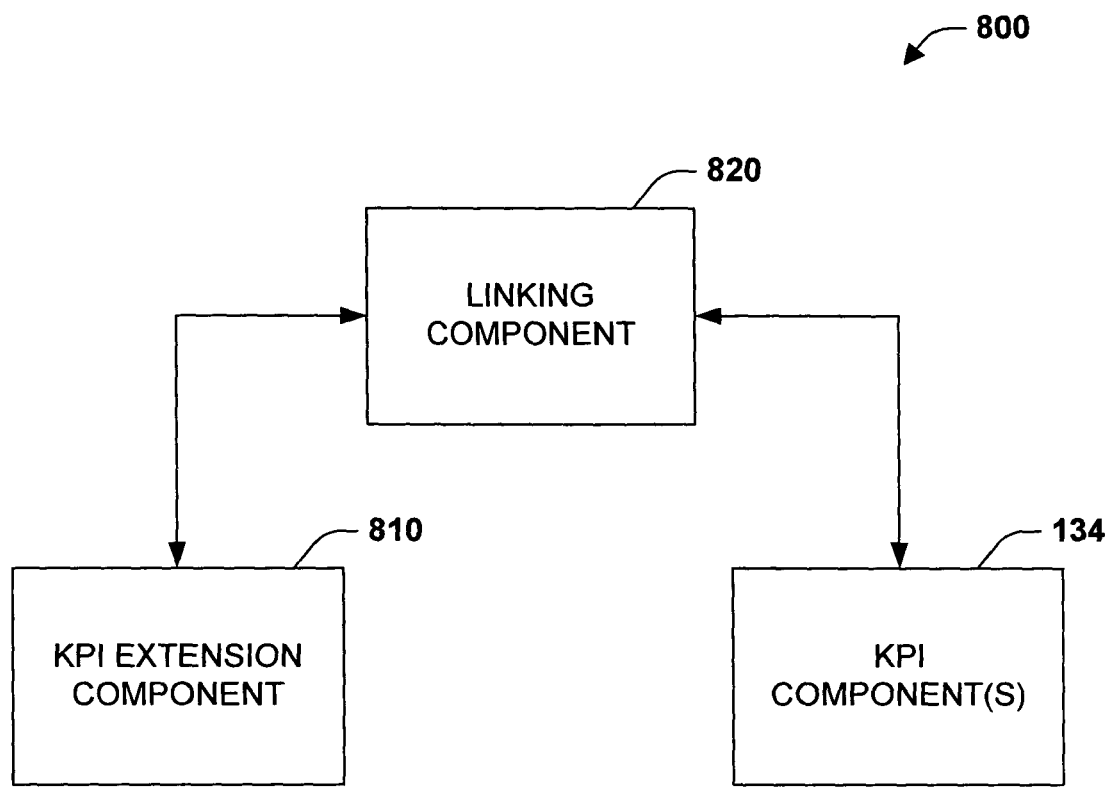
FIG. 8 is a block diagram of a KPI extension system in accordance with an aspect of the subject invention.

FIG. 8 is a KPI extension system 800 in accordance with an aspect of the subject invention. By default, a KPI system will include KPIs with a particular set of attributes and/or elements. This set is optimized to provide the most popular attributes while not over burdening the system with less commonly employed elements. However, there may be times when there is a need to extend KPI components. By way of example, one may want to extend the KPI component, for example, to associate a create date, last modified, and/or owner attribute with the KPI. Then, if the KPI is in bad standing such as when there is decreasing customer satisfaction, a responsible person can be identified by determining the owner of the KPI. In another example, a KPI component 134 can be extended to identify subordinate KPIs. A KPI component 134 can also be extended to include a child status expression. This extension could allow an application to bubble up a problem. More specifically, if a KPI has many children and one of those children is out of bounds, meaning the status is poor, an application could bubble this up to the parent KPI. Extension system 800 provides a mechanism to enable such extension.

Extension system 800 includes KPI component 134, extension component 810 and linking component 820. As previously discussed, a KPI component 134 defines a KPI via a collection of attributes or elements. Extension component 810 can provide one or more additional attributes or elements. Linking component 820 can link or tie the extension component 810 to the KPI component 134. This linking extends the original attributes or elements provided by the KPI component with the new attributes or elements provided by the extension component. In accordance with one aspect of the invention, such a mechanism can correspond to placing a link or pointer into a designated attribute of the KPI component such as the annotation attribute. If the KPIs are defined in a markup language such as XML, then the extension component can be defined similarly. System 800 therefore enables dramatic extension of KPI information.

Figure 9:
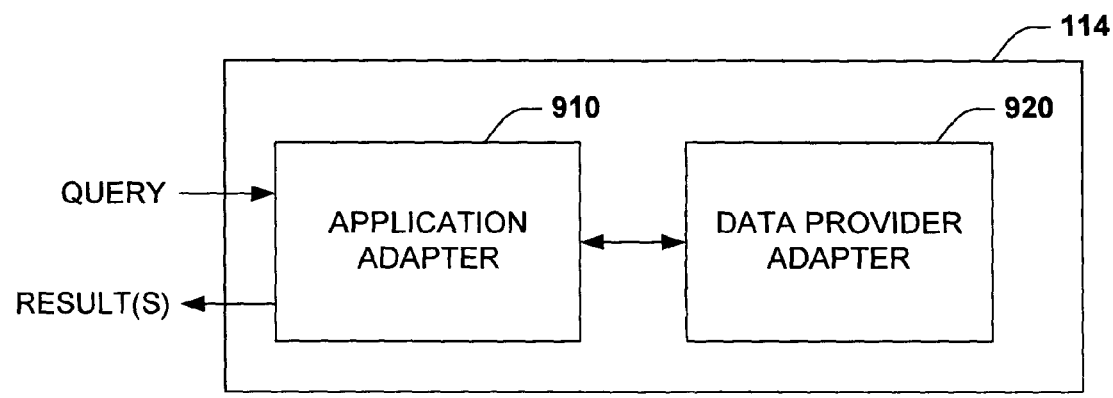
FIG. 9 is a block diagram of a application interface component in accordance with an aspect of the subject invention.

Turning to FIG. 9, an exemplary application interface component 114 is depicted in accordance with an aspect of the invention. Interface component 114 can facilitate interaction of an application with a data source or store. As disclosed in previous sections, an application utilizing KPIs will necessarily need to query for KPI data. Interface component 114 can provide a connection between an application and a data source. Interface component 114 can include an application adapter component 910 and a data provider adapter component 920. Application adapter component 910 can receive data or queries from an application and return results to the application. Data provider adapter 920 receives a request from the application adapter and processes such a requested on a data source. Upon receipt of results, the data provider adapter 920 can communicate the results to the application adapter 910, which can then provide such results to the requesting application, perhaps for further processing. For example, assume an application is to display a KPI value and thus needs to retrieve such value. Utilizing interface 114 an application will request such a value from a data source for instance in the form a function or command, KPIValue<KPIName>. Application adapter 910 can receive this command and pass it to data provider adapter 920. Data provider adapter 920 can then execute or schedule the execution of the command, function, or some version thereof on the data source and retrieve or receive the result (e.g., $80,000.00). Data provider adapter 920 can then provide the result to the application adapter 910, which can then communicate the result to the application.

Figure 10:
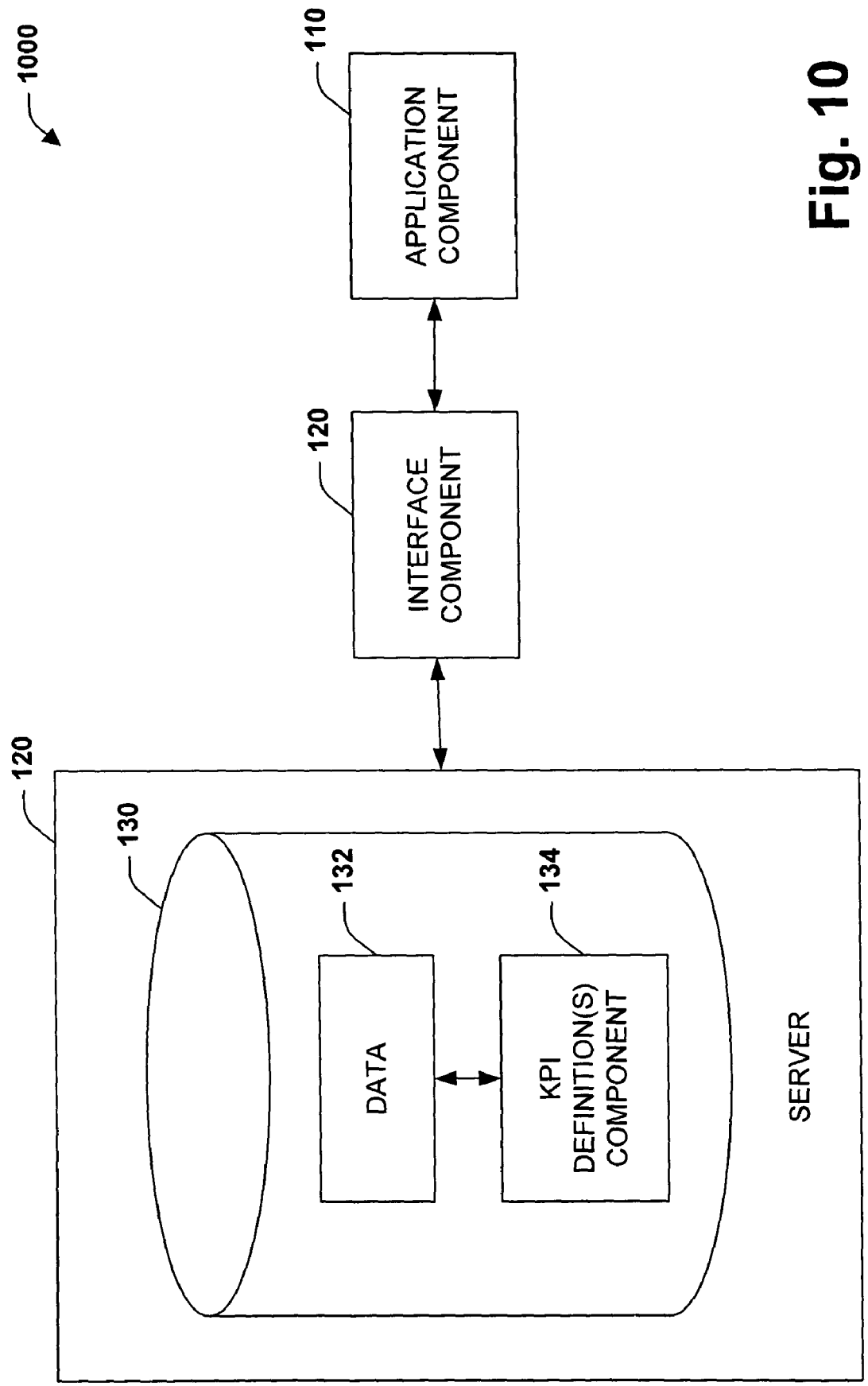
FIG. 10 is a block diagram of a KPI system in accordance with an aspect of the subject invention.

FIG. 10 depicts a KPI system 1000 in accordance with an aspect of the subject invention. KPI system 100 includes an application component 110, an interface component 114, and a server 120 including data source 130, data 132 and KPI component(s) 134. Application component 110 can be a computer program or computer program product including a plurality or executable instructions for performing one or more functions. One of those functions can include presentation, interaction, or processing of key performance indicators. Server 140 is a computer or computing device that provides data to other computers or applications over a network. Server 140 can manage the resources such as one or more data stores or databases 130. According to one aspect of the invention, the server 140 can be an analysis server and the database 130 can be a multidimensional database. However, it should be appreciated that the invention is not so limited. Various aspects of the present invention can be performed on a server designated for a different purpose and possibly storing data in a relational format. Database 130 stores data 130. Similarly, database 130 can store a specific type of data namely metadata. Metadata is simply data about or concerning other data. Such metadata can be a schema describing how other data is organized, for example, cubes, dimensions, hierarchies, measures, and so forth for a multidimensional database. According to another aspect of the invention, additional metadata can be stored corresponding to a KPI component(s) 134. KPIs are collections of attributes or elements. Accordingly, a KPI component can provide for and define a KPI as previously described. Interface component 120 can facilitate retrieval and transmission of data concerning or pertaining to KPIs over a network. In particular, interface component 120 can enable application component to request and receive KPI data. For example, application component can request and receive data regarding available KPIs and their properties and/or retrieve specific KPI attributes or values. Interface component 120 can be a set or collection of protocols, routines, and/or instructions facilitating communication between the server 140 and client application 110. Such interface 120 can reside and execute on another server such as a web server (not shown) located between the server 140 and an application 110, for example executing on a client computer.

Such an interface component 120 can employ extended versions of conventional technologies including but in not limited to XMLA, OLE DB/OLAP, ADOMD.net, and JDBC. XMLA (XML for Analysis) is a simply object access protocol (SOAP) based XML application program interface (API). It standardizes data access to a data provider over a network, such as the Internet. It requires no client application software, and provides to access methods Discover and Execute. Discover is a command that can be utilized to obtain metadata such as available data sources and their properties. Execute can be employed to execute multidimensional expressions (MDX) or commands to query and retrieve data from a data source. In conjunction with aspects of the subject invention, XMLA can be employed to discover KPI components and execute MDX commands to retrieve specific KPI data elements or values. The other mentioned technologies are more proprietary or implementation specific. OLE DB/OLAP is a low level API for accessing data from a data source. ADOBD-.net is a data access interface the facilitates retrieval of multidimensional data and data object such as CubeDef, dimension, level, member for the Visual Basic programming language. Similarly, JDBC (Java DataBase Connectivity) provides a programming interface for connecting to databases from programs written in Java. The subject invention contemplates modifications to the aforementioned and other interfaces or components thereof to support discovery of stored KPI components and retrieval of KPI data such as attributes and values from a data source.

In view of the exemplary systems described supra, methodologies that may be implemented in accordance with the present invention will be better appreciated with reference to the flow charts of FIGS. 11-15. While for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from what is depicted and described herein. Moreover, not all illustrated blocks may be required to implement the methodology in accordance with the present invention.

Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 11:
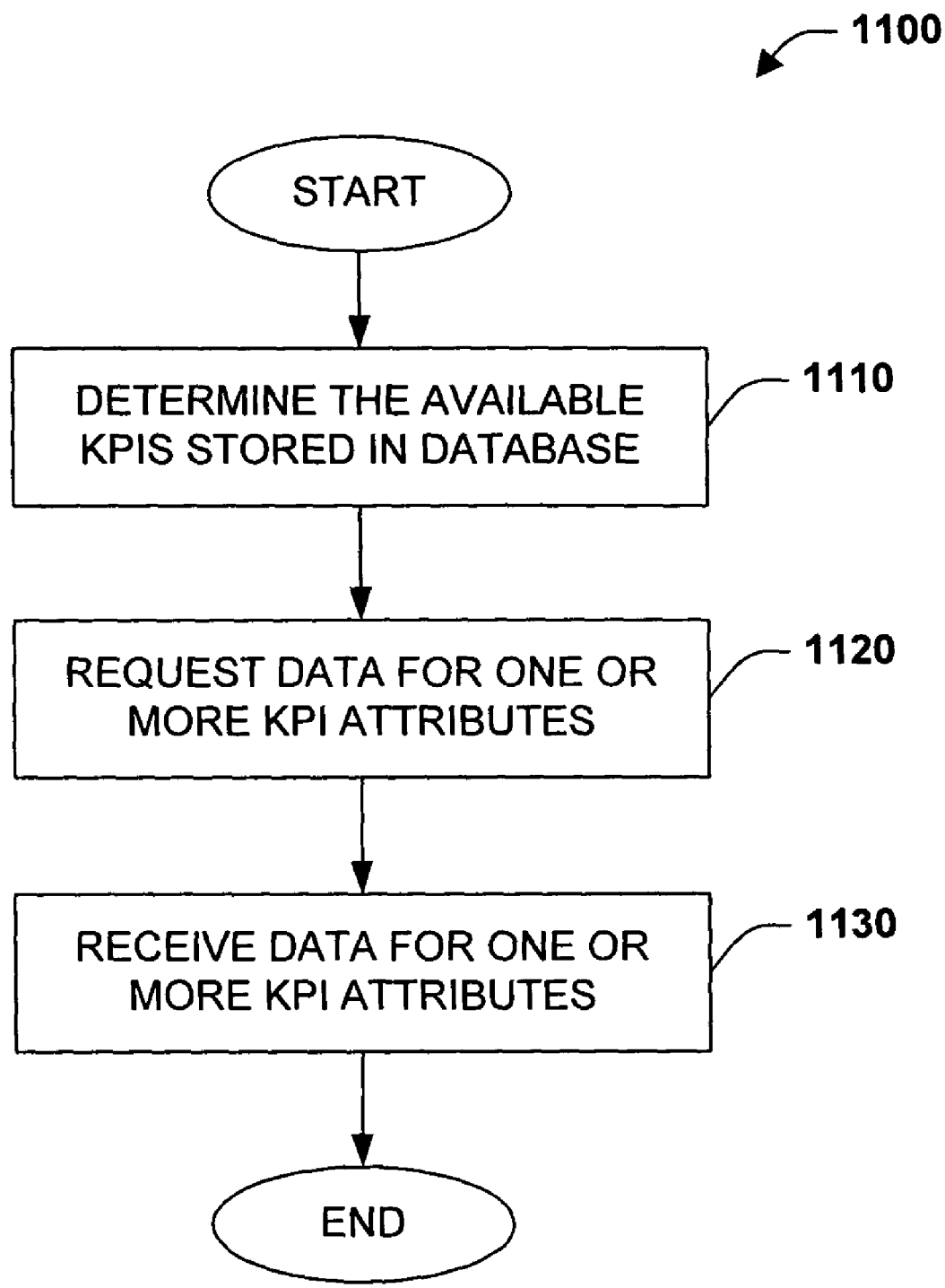
FIG. 11 is a flow chart diagram of a method of interacting with key performance indicators in accordance with an aspect of the subject invention.

Turning to FIG. 11, a method 1100 of interacting with key performance indicators is depicted in accordance with an aspect of the subject invention. At 1110, available KPIs are determined or discovered. Unlike conventional techniques where a KPI application is a specific stand-alone application, the subject invention stores KPI data and definitions as data in a data source, such as a database. Accordingly, if a generic application wishes to interact with or display KPI data it must first determine the KPIs that are available. This can be accomplished by querying or interrogating the data source. More specifically a command or query can be issued to discover and provide information about the available KPIs. For instance, an XML document can be generated and provided describing available KPIs and their attributes. Once the available KPIs are discovered or identified, then they can be accessed and utilized. At 1120, a request can be issued for data concerning one or more KPI attributes or elements. For example, an entity may like to know the value of a KPI, the status, the trend and the like. In such a scenario, a request for such data can be issued. According to one specific aspect of the invention, this request can be in the form of an MDX or multidimensional expression for a multidimensional database. This request can then be transmitted via an interface from a requesting entity, such as a generic application, to a data source or a data provider. The query can then be executed on the data source and data returned. At 1130, the requested data can be received by the requesting entity.

Figure 12:
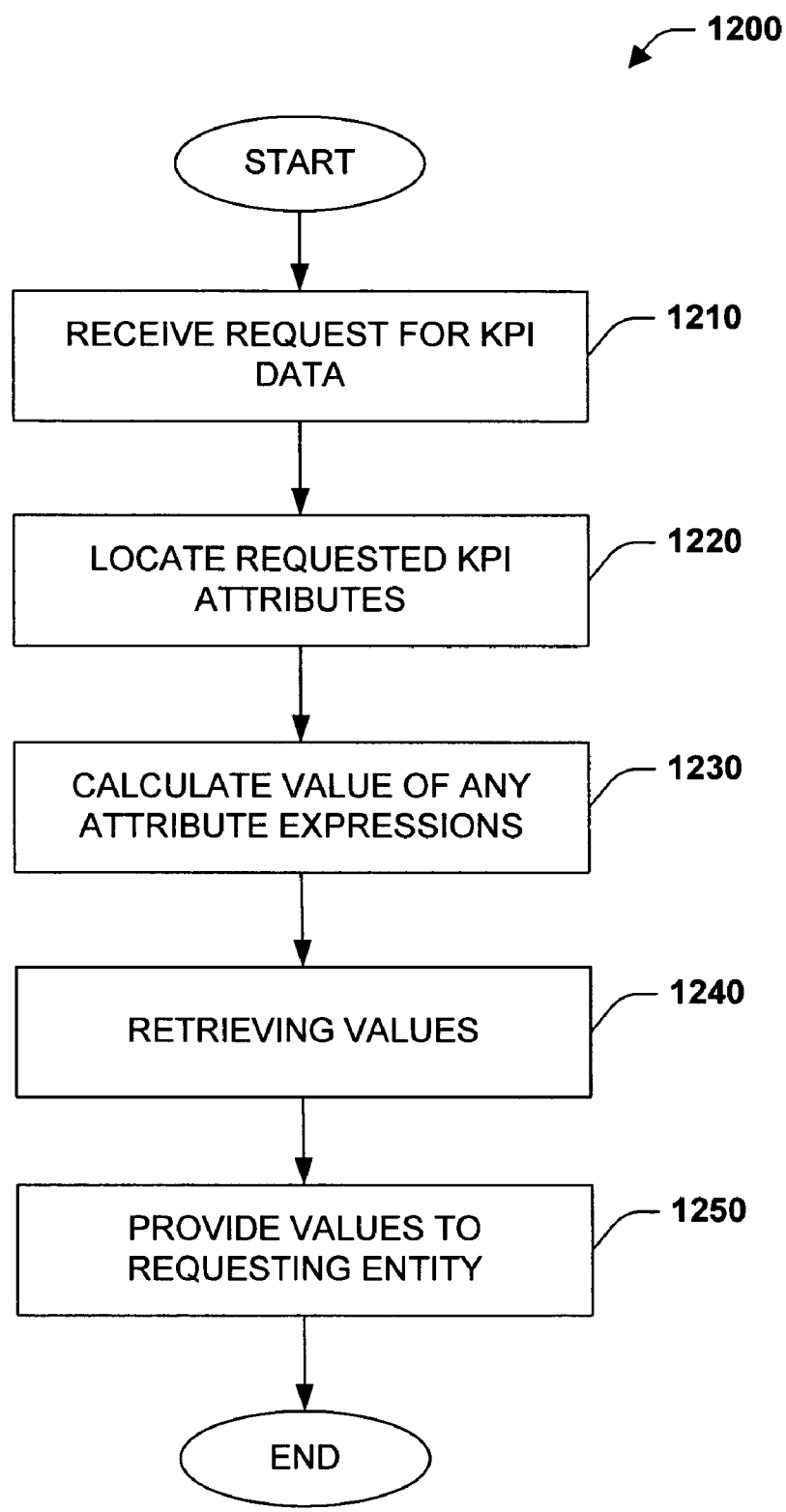
FIG. 12 is a flow chart diagram of a KPI processing methodology in accordance with an aspect of the subject invention.

FIG. 12 depicts a KPI processing methodology 1200 in accordance with an aspect of the subject invention. According to a specific aspect of the invention, the KPI processing methodology 1200 can be executed by a server or database management system. At 1210, a request for KPI data is received. As mentioned previously, this requested can originate with an entity such as a generic application by way of an interface. The request itself can take the form of a database query or function, for example KPIValue<KPI_Name>. This query can then be executed on data including KPI data. At 1210, the requested KPI attributes or elements are located. At 1230, any attributes that contain functions or expressions are evaluated or located if previously evaluated proactively by an expression engine, for example. In multidimensional database terms, these expressions would be referred to as calculated members and can include but are not limited to KPI value, status and trend. This calculation of expression(s) provides a layer of abstraction between a requesting entity and the processing methodology such that the requesting entity need not be aware of the data or structure thereof to employ KPIs. Furthermore, it should be appreciated that this calculation or evaluation can be automatically completed and cached, for instance, at any time not just upon request of a particular attribute. Still further yet it should be appreciated that such calculations can be performed in a very expeditions manner since, according to an aspect of the invention, they can be executed by a server, database management system, and/or execution engine associated therewith. At 1240, values can be retrieved from the data source. Finally, at 1250 the retrieved values can be provided back to the requesting entity, via an interface, for instance.

Figure 13:
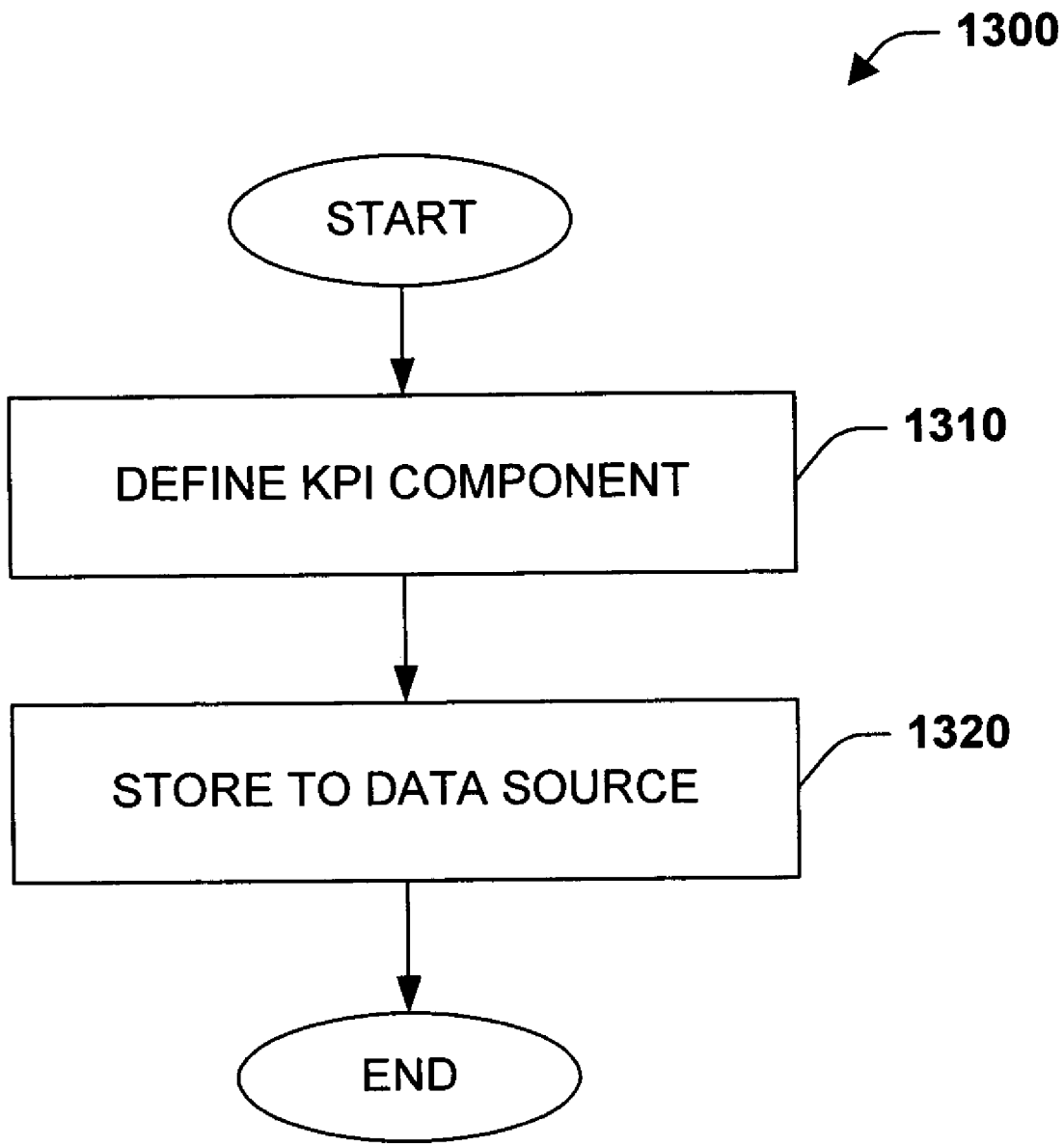
FIG. 13 is a flow chart diagram of a method for defining a KPI component in accordance with an aspect of the subject invention.

FIG. 13 illustrates a method 1300 for defining KPI components in accordance with an aspect of the subject invention.

KPI components consist of collection of properties, attributes, or elements. Such elements can include but are not limited to name, id, description, display folder, associated measure group, value, goal, status, trend, trend graphic, status graphic, and annotation. According to an aspect of the invention, KPIs are defined and saved as data in a data store, rather than in a specific KPI application. At 1310, a KPI component is defined. In particular, its attributes are defined by specifying values, expressions or functions. Definition of a KPI component can be accomplished by a plurality of means. For example, one could specify a document such as an XML document, in the exact form that needs to be saved in the data store. Alternatively, a data definition language can be employed to specify KPI component attributes which can be compiled or translated into the appropriate format for storage. Still further yet, a design environment including a graphical user interface, intelligent assist component and debug component to facilitate easier specification of attributes. The design environment or system can then convert the attributes to the appropriate format or to a data definition language that can later convert the attributes to an acceptable format. Finally, at 1320, the defined KPI components can be stored to the data source. Once defined and stored, the KPI components are eligible to be discovered and utilized by a generic application.

Figure 14:
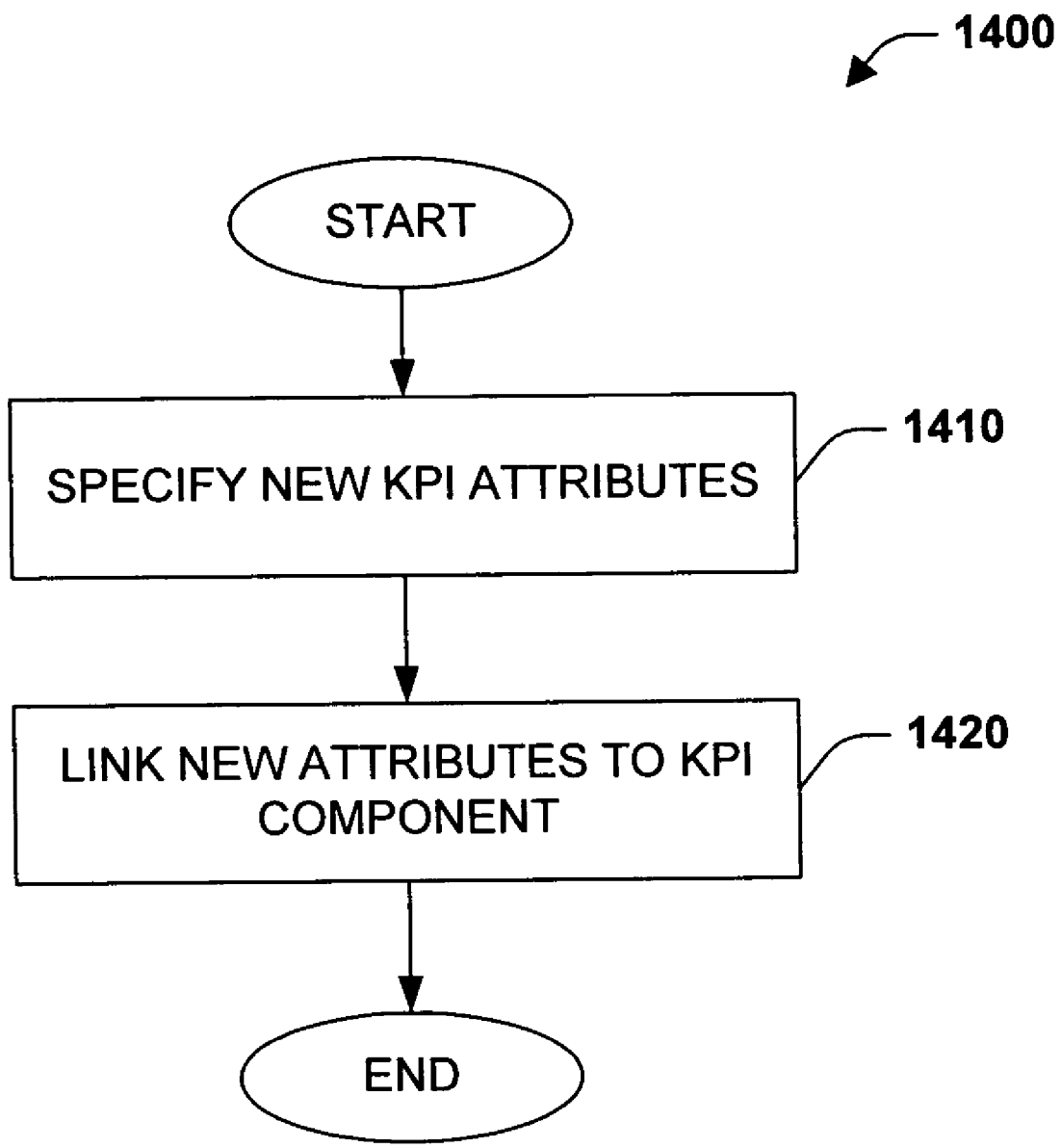
FIG. 14 is a flow chart diagram of a method of extending a KPI component in accordance with an aspect of the subject invention.

Turning to FIG. 14, a method 1400 for extending KPI components is illustrated in accordance with an aspect of the invention. For purposes of efficiency and optimization, KPI components will not contain every possible attribute that may be useful and desired for a particular application. Accordingly, method 1400 is provided to describe a method or process for extending KPI components. At 1410, new attributes are specified for a KPI. This can be done manually be specify, for example, an XML document describing the new attributes. Alternatively, a design system or environment may be employed to facilitate such development. Once, an extension component is created specifying new attributes at 1410, it can be linked to a current KPI component or definition, at 1420. According to one aspect of the invention, default KPI components can include a specific attribute to enable extensibility, such as the annotation attribute. To link a KPI component to an extension component, a designated attribute can be altered to act as a pointer to the extension component. Once this is done, the KPI will contain all the properties or attributes in the original KPI definition as well as those in the extension component.

Figure 15:
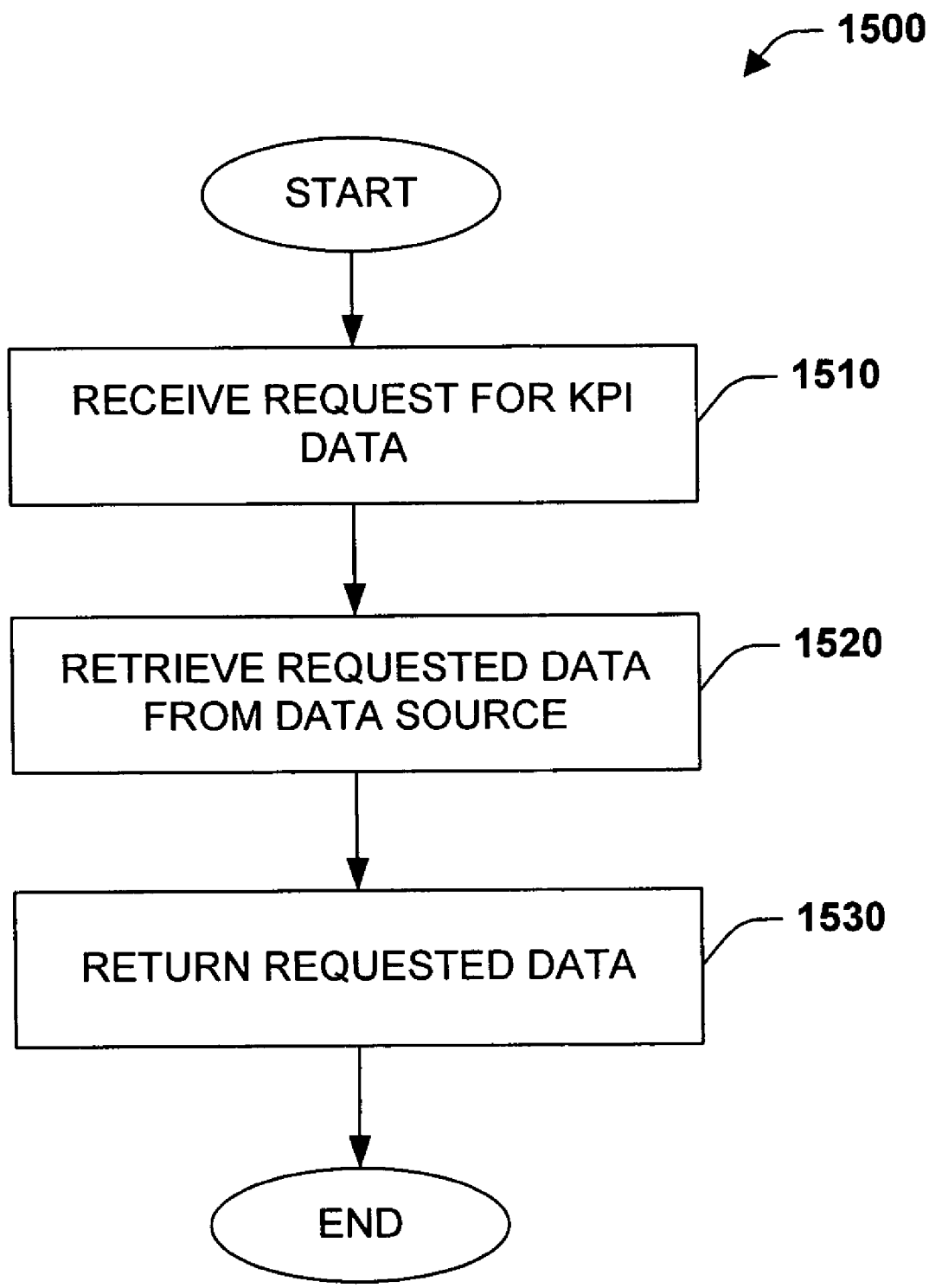
FIG. 15 is a flow chart diagram of a KPI interface methodology in accordance with an aspect of the subject invention.

FIG. 15 illustrates a KPI interface methodology 1500 in accordance with an aspect of the subject invention. At 1510, a request for KPI data is received from an entity such as a generic client application. The request can take the form of a query, statement or the like requesting specific KPI data. For example, the statement can be KPIvalue<KPI_Name>. Alternatively, a discover call can be received to discover available APIs to facilitate later querying for specific KPI data. It should be appreciated that the received request does not specify any database schema specific information (e.g., select [Measures].members on Columns from Sales) as the generic applications need not have knowledge of such schema. At 1520, such requested data is received or retrieved from a data source or provider. This can be accomplished by providing a database management system or query engine associated with a data source with an executable query. The query can be executed on the data source and a result or result set received (e.g., rowset, cube, table . . . ). At 1530, the retrieved or received result can subsequently be returned or transmitted to the requesting entity.

Figure 16:
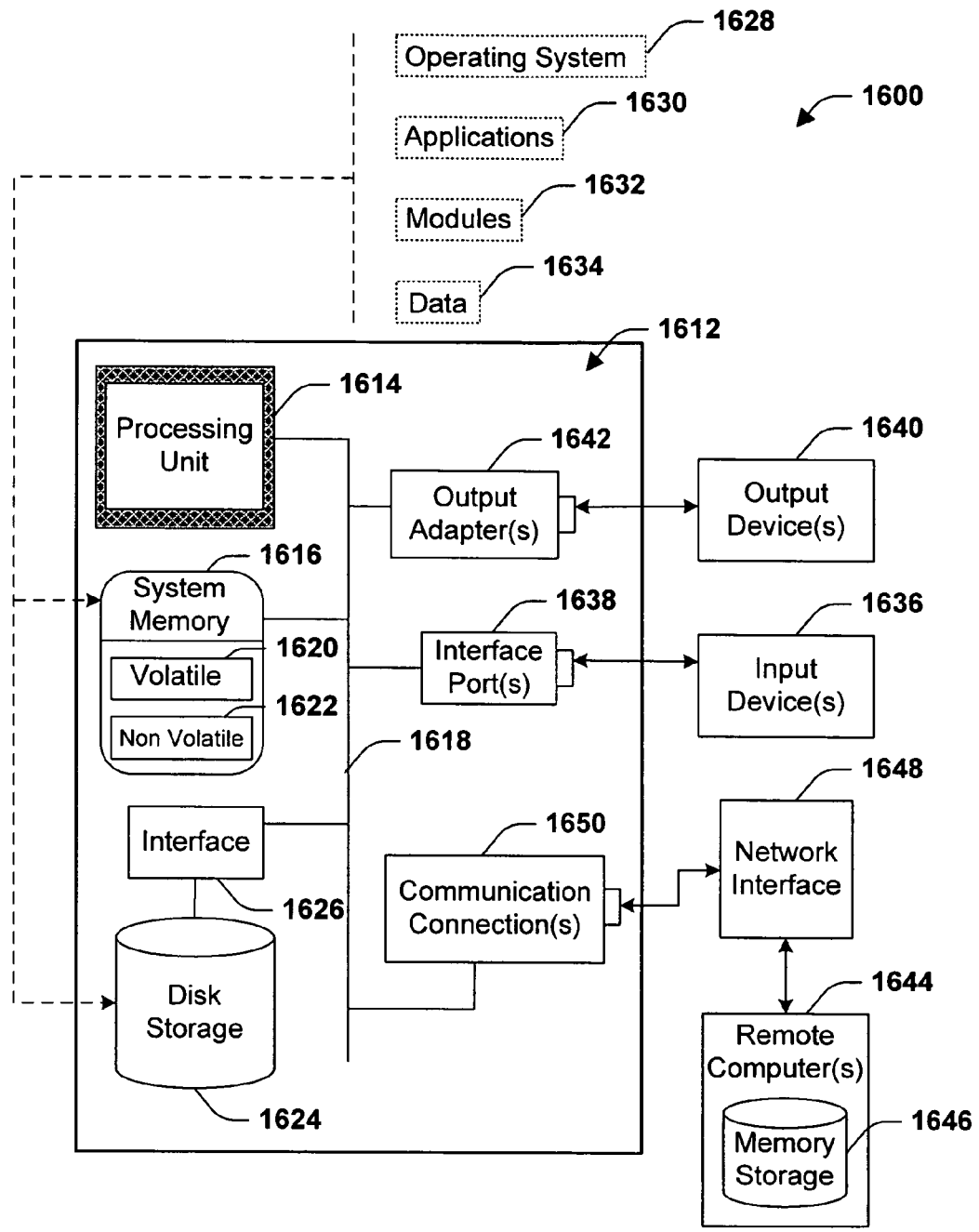
FIG. 16 is a schematic block diagram illustrating a suitable operating environment in accordance with an aspect of the present invention.
Figure 17:
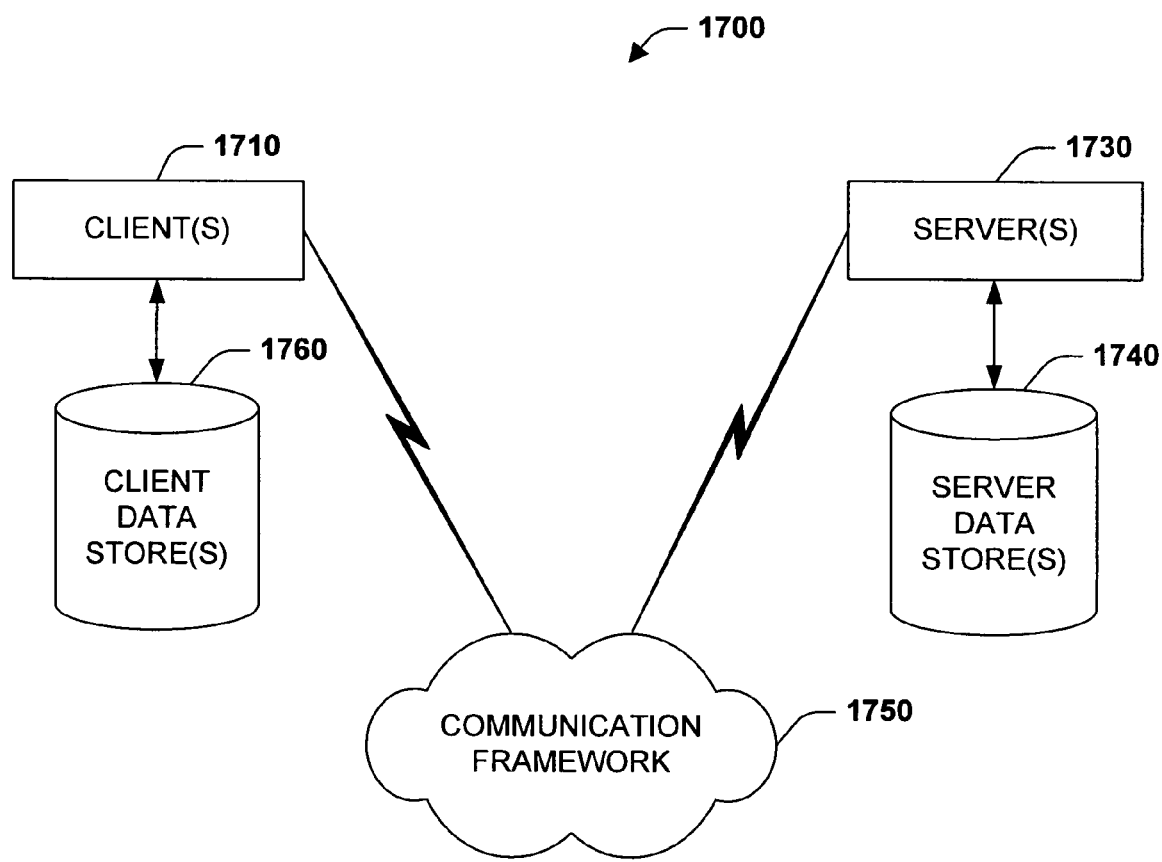
FIG. 17 is a schematic block diagram of a sample-computing environment with which the present invention can interact.

In order to provide a context for the various aspects of the invention, FIGS. 16 and 17 as well as the following discussion are intended to provide a brief, general description of a suitable computing environment in which the various aspects of the present invention may be implemented. While the invention has been described above in the general context of computer-executable instructions of a computer program that runs on a computer and/or computers, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices, microprocessor-based or programmable consumer electronics, and the like. The illustrated aspects of the invention may also be practiced in distributed computing environments where task are performed by remote processing devices that are linked through a communications network. However, some, if not all aspects of the invention can be practiced on stand-alone computers. In a distributed computing environment, program modules may be located in both local and remote memory storage devices.

With reference to FIG. 16, an exemplary environment 1610 for implementing various aspects of the invention includes a computer 1612. The computer 1612 includes a processing unit 1614, a system memory 1616, and a system bus 1618. The system bus 1618 couples system components including, but not limited to, the system memory 1616 to the processing unit 1614. The processing unit 1614 can be any of various available processors. Dual microprocessors and other multiprocessor architectures also can be employed as the processing unit 1614.

The system bus 1618 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1616 includes volatile memory 1620 and nonvolatile memory 1622. The basic input/output system (BIOS), containing the basic routines to transfer information between elements within the computer 1612, such as during start-up, is stored in nonvolatile memory 1622. By way of illustration, and not limitation, nonvolatile memory 1622 can include read only memory (ROM), programmable ROM (PROM), electrically programmable ROM (EPROM), electrically erasable ROM (EEPROM), or flash memory. Volatile memory 1620 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1612 also includes removable/non-removable, volatile/non-volatile computer storage media. FIG. 16 illustrates, for example disk storage 1624. Disk storage 4124 includes, but is not limited to, devices like a magnetic disk drive, floppy disk drive, tape drive, Jaz drive, Zip drive, LS-100 drive, flash memory card, or memory stick. In addition, disk storage 1624 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1624 to the system bus 1618, a removable or non-removable interface is typically used such as interface 1626.

It is to be appreciated that FIG. 16 describes software that acts as an intermediary between users and the basic computer resources described in suitable operating environment 1610. Such software includes an operating system 1628. Operating system 1628, which can be stored on disk storage 1624, acts to control and allocate resources of the computer system 1612. System applications 1630 take advantage of the management of resources by operating system 1628 through program modules 1632 and program data 1634 stored either in system memory 1616 or on disk storage 1624. It is to be appreciated that the present invention can be implemented with various operating systems or combinations of operating systems.

A user enters commands or information into the computer 1612 through input device(s) 1636. Input devices 1636 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1614 through the system bus 1618 via interface port(s) 1638. Interface port(s) 1638 include, for example, a serial port, a parallel port, a game port, and a universal serial bus (USB). Output device(s) 1640 use some of the same type of ports as input device(s) 1636. Thus, for example, a USB port may be used to provide input to computer 1612 and to output information from computer 1612 to an output device 1640. Output adapter 1642 is provided to illustrate that there are some output devices 1640 like displays (e.g., flat panel and CRT), speakers, and printers, among other output devices 1640 that require special adapters. The output adapters 1642 include, by way of illustration and not limitation, video and sound cards that provide a means of connection between the output device 1640 and the system bus 1618. It should be noted that other devices and/or systems of devices provide both input and output capabilities such as remote computer(s) 1644.

Computer 1612 can operate in a networked environment using logical connections to one or more remote computers, such as remote computer(s) 1644. The remote computer(s) 1644 can be a personal computer, a server, a router, a network PC, a workstation, a microprocessor based appliance, a peer device or other common network node and the like, and typically includes many or all of the elements described relative to computer 1612. For purposes of brevity, only a memory storage device 1646 is illustrated with remote computer(s) 1644. Remote computer(s) 1644 is logically connected to computer 1612 through a network interface 1648 and then physically connected via communication connection 1650. Network interface 1648 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit-switching networks like Integrated Services Digital Networks (ISDN) and variations thereon, packet switching networks, and Digital Subscriber Lines (DSL).

Communication connection(s) 1650 refers to the hardware/software employed to connect the network interface 1648 to the bus 1618. While communication connection 1650 is shown for illustrative clarity inside computer 1612, it can also be external to computer 1612. The hardware/software necessary for connection to the network interface 1648 includes, for exemplary purposes only, internal and external technologies such as, modems including regular telephone grade modems, cable modems, power modems and DSL modems, ISDN adapters, and Ethernet cards.

FIG. 17 is a schematic block diagram of a sample-computing environment 1700 with which the present invention can interact. The system 1700 includes one or more client(s) 1710. The client(s) 1710 can be hardware and/or software (e.g., threads, processes, computing devices). The system 1700 also includes one or more server(s) 1730. The server(s) 1730 can also be hardware and/or software (e.g., threads, processes, computing devices). The server(s) 1730 can house threads to perform transformations by employing the present invention, for example. One possible communication between a client 1710 and a server 1730 may be in the form of a data packet transmitted between two or more computer processes. The system 1700 includes a communication framework 1750 that can be employed to facilitate communications between the client(s) 1710 and the server(s) 1730. The client(s) 1710 are operably connected to one or more client data store(s) 1760 that can be employed to store information local to the client(s) 1710. Similarly, the server(s) 1730 are operably connected to one or more server data store(s) 1740 that can be employed to store information local to the servers 1730.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the terms "includes," "has," and "having" are used in either the detailed description or the claims, such term is intended to be inclusive in a manner similar to the term "comprising" as "comprising" is interpreted when employed as a transitional word in a claim.

What is claimed is:

1. A computer system comprising:
    a processor that processes one or more key performance indicator (KPI) components that define KPI, the KPIs being part of metadata that describes data from which the KPIs are generated, wherein the one or more KPI components are located in a data store that also stores the data from which the KPIs are generated, wherein each KPI includes a plurality of attributes including name, value, status, and trend, as well as expressions for retrieving KPI component data;
    an expression engine through which a generic application component communicates with the data store to facilitate retrieval and receipt of KPI component data;
    an inference component of the expression engine to generate and cache KPIs proactively by determining a probability that an expression of a KPI component will be requested and upon determining that the probability exceeds a threshold, automatically generating and caching the KPI from the expression;

an intelligent assist component that automatically predicts, suggests, or infers possible attributes to be included in a KPI component and/or performs KPI component adjustments to support defined KPIs;

a KPI design component to facilitate definition of one or more KPIs;

a linking component that links an extension component that provides additional KPI attributes to an existing KPI component; and the generic application component that extracts and displays data from the data store without a priori knowledge of an actual data schema of the data store, wherein the application component includes an interface to aid retrieval and receipt of KPIs.

2. The system of claim 1, wherein the generic application component includes an interface to aid retrieval and receipt of KPIs.

3. A computer implemented key performance indicator (KPI) interaction method comprising the following steps performed by a processor:

receiving, from a generic application component, a request at an expression engine, for KPI data, the KPI data being metadata to data in a database such that the KPI data is stored centrally in the database, the data being used to generate the KPI data, the KPI data comprising KPI attributes or elements including name, value, status, and trend, as well as expressions for retrieving KPI component data, wherein the expression engine includes the following components;

an inference component to generate and cache KPIs proactively by determining a probability that an expression of a KPI component will be requested and upon determining that the probability exceeds a threshold, automatically generating and caching the KPI from the expression;

an intelligent assist component that automatically predicts, suggests, or infers possible attributes to be included in a KPI component and/or performs KPI component adjustments to support defined KPIs;

a KPI design component to facilitate definition of one or more KPIs; and a linking component that links an extension component that provides additional KPI attributes to an existing KPI component;

the expression engine locating the requested KPI data in the database;

for any attribute of the located KPI data that comprises an expression, the expression engine calculating the value of the attribute; and the expression engine returning the KPI data to the generic application component, wherein the generic application component extracts the KPI data from the database using an application program interface that abstracts the actual schema for making requests for data of the database such that the KPI data is extracted and displayed without a priori knowledge of the actual schema for making requests for data of the database.

4. The method of claim 3, wherein receiving the request comprises receiving a database query command or function.

5. The method of claim 4, wherein the command or function is a multidimensional expression (MDX).

6. A computer storage readable medium having stored thereon computer executable instructions which when executed by a processor of a computing system perform steps comprising:

receiving, from a generic application component, a request, at an expression engine, for KPI data, the KPI data being metadata to data in a database such that the KPI data is stored centrally in the database, the data being used to generate the KPI data, the KPI data comprising KPI attributes or elements including name, value, status, and trend, as well as expressions for retrieving KPI component data, wherein the expression engine includes the following components;

an inference component to generate and cache KPIs proactively by determining a probability that an expression of a KPI component will be requested and upon determining that the probability exceeds a threshold, automatically generating and caching the KPI from the expression;

an intelligent assist component that automatically predicts, suggests, or infers possible attributes to be included in a KPI component and/or performs KPI component adjustments to support defined KPIs;

a KPI design component to facilitate definition of one or more KPIs; and a linking component that links an extension component that provides additional KPI attributes to an existing KPI component;

the expression engine locating the requested KPI data in the database; for any attribute of the located KPI data that comprises an expression, the expression engine calculating the value of the attribute; and the expression engine returning the KPI data to the generic application component, wherein the generic application component extracts the KPI data from the database using an application program interface that abstracts the actual schema for making requests for data of the database such that the KPI data is extracted and displayed without a priori knowledge of the actual schema for making requests for data of the database.

* * * * *